United States Patent [19]

Brenneman

[11] Patent Number: 4,512,752
[45] Date of Patent: Apr. 23, 1985

[54] BELT TENSIONING DEVICE

[76] Inventor: Gary W. Brenneman, Rte. 2, Meadville, Mo. 64659

[21] Appl. No.: 454,979

[22] Filed: Jan. 3, 1983

[51] Int. Cl.³ .............................................. F16H 7/14
[52] U.S. Cl. ..................................... 474/114; 474/133
[58] Field of Search ................................. 474/113–115, 474/87, 133

[56] References Cited

U.S. PATENT DOCUMENTS

| | | | |
|---|---|---|---|
| 1,413,028 | 4/1922 | Ireland et al. | 474/114 |
| 1,799,261 | 4/1931 | Stoody | 474/114 |
| 1,847,720 | 3/1932 | Marcellis | 474/133 |
| 2,020,764 | 11/1935 | Bradford | 474/115 |
| 2,341,992 | 2/1944 | Jarrett | 474/114 |
| 2,458,575 | 1/1949 | Ensinger | 474/114 |
| 2,494,360 | 1/1950 | Russell | 474/114 |
| 2,643,551 | 5/1953 | Russell | 474/114 |
| 3,922,927 | 12/1975 | Shiki et al. | 474/113 |
| 4,240,368 | 12/1980 | Adams | 474/113 |

Primary Examiner—James A. Leppink
Assistant Examiner—Frank H. McKenzie, Jr.
Attorney, Agent, or Firm—Kokjer, Kircher, Bradley, Wharton, Bowman & Johnson

[57] ABSTRACT

A device for adjusting the tension of a drive belt such as the belt used to drive an alternator or other accessory in an automotive engine. The tensioning device includes one angle bracket secured to a slotted plate having an arcuate slot formed about a pivot axis on which the accessory is angularly adjustable. An adjustment bolt secures another angle bracket to the slotted plate and is extended through the arcuate slot and threaded into the accessory. A machine screw extends between the two angle brackets and is threaded through one of them. The screw drives the brackets toward and away from one another to adjust the belt tension when the screw is turned with the adjustment bolt loosened. When the adjustment bolt is tightened, it locks the accessory in place.

15 Claims, 3 Drawing Figures

4,512,752

BELT TENSIONING DEVICE

BACKGROUND AND SUMMARY OF THE INVENTION

This invention relates to the tensioning of drive belts and deals more particularly with a device that serves to adjust the tension of a drive belt such as the alternator belt of an automotive engine.

Various accessories such as alternators, compressors, pumps and the like are commonly driven by the engine of an automobile, truck or tractor, or by an industrial engine. Typically, the accessory is driven by a pulley which is in turn driven by an engine driven pulley through a drive belt. The accessory is usually mounted on the engine in a manner permitting it to be adjusted in order to tighten the drive belt. To adjust the belt tension, a bolt which extends through a slotted plate and is threaded into the accessory must be loosened, and a pry bar is normally used to pry the accessory until the belt is properly tensioned. Then, the bolt is tightened again.

As can easily be appreciated, this procedure is rather difficult to carry out by persons lacking in mechanical skill, and it requires the expenditure of considerable physical effort. Also, there is often inadequate space available for the pry bar to be properly applied. Even if there is sufficient room to use the pry bar, the possibility always exists that it will damage the alternator or other accessory, the electrical wiring, heater hoses, air conditioner hoses, fuel lines, or other components of the engine. As a result, many belts are not maintained at the proper tension, and the operating lives of the belt and pulleys are reduced due to the belt slack.

Although there have been attempts made to simplify the tightening of drive belts, the results have not been entirely satisfactory. Arrangements of the type shown in U.S. Pat. Nos. 2,494,360 and 2,643,551 to Russell and 2,341,992 to Jarrett require sliding carriages that take up considerable space which is often at a premium in engine compartments. Also, the need for cranks and other complicated mechanisms makes these devices too costly and complex to be practical. Lever operated devices such as those shown in the Stoddy U.S. Pat. No. 1,799,261 and Ensinger U.S. Pat. No. 2,458,575 patents are likewise characterized by excessive complexity and by mechanical problems resulting from by the need for cams, latches and similar components. Cost and complexity problems are also encountered by arrangements that require special castings or other specially constructed motor mounting devices, such as shown in U.S. Pat. No. 2,020,764 to Bradford and U.S. Pat. No. 4,240,368 to Adams.

The approach taken by Ireland et al in U.S. Pat. No. 1,413,028 is somewhat less complicated, although it does require a hinged structure for mounting the accessory and is less than satisfactory in this regard. The mechanism disclosed in U.S. Pat. No. 3,922,927 to Shiki et al must be factory or shop installed because its various parts must be welded or otherwise permanently attached to the accessory and its adjustment plate. Accordingly, this device is not suitable for field installation and requires considerable mechanical skill to install in any event.

The present invention is directed to an improved belt tensioning device which is simple and economical to construct and easily installed without the need for special tools or mechanical ability. In accordance with the invention, two angle brackets are added to a slotted plate on which an alternator or other engine accessory is mounted for angular movement to adjust the tension of the belt which drives the accessory. One bracket is directly connected to the plate by a bolt. The other bracket receives another bolt which fits through an arcuate slot in the plate and is threaded into the accessory. This bolt thus serves both to connect the second angle bracket to the accessory and to lock the accessory in place once the belt tension has been properly adjusted.

A machine screw extends between the two angle brackets and is threaded through one of them. The screw extends loosely through an opening in the other bracket and is restricted against axial movement by the screw head on one side and by a nut secured to the screw shank on the other side. When the bolt which extends through the arcuate slot is loosened, the machine screw can be turned and acts as a screw drive mechanism to move the angle brackets farther apart, thus tightening the belt which transmits power to the accessory. Once the proper belt tension is achieved, the bolt is tightened again to secure the accessory in place.

It is a particular feature of the invention that the proper belt tension can be achieved and maintained in a precise manner without the need for a pry bar or any special tools and without the need for mechanical skills or physical strength. The only tool required is the same wrench that is required in any event to loosen the adjustment bolt. The screw drive provides mechanical advantage which minimizes the physical effort that is necessary to tighten the belt. Equally significant is the fact that all of the components simply bolt onto existing parts of the engine. Consequently, the device can be installed in the field and need not be factory or shop installed by specially skilled mechanics.

DETAILED DESCRIPTION OF THE INVENTION

In the accompanying drawing which forms a part of the specification and is to be read in conjunction therewith and in which like reference numerals are used to indicate like parts in the various views.

Figure 1:
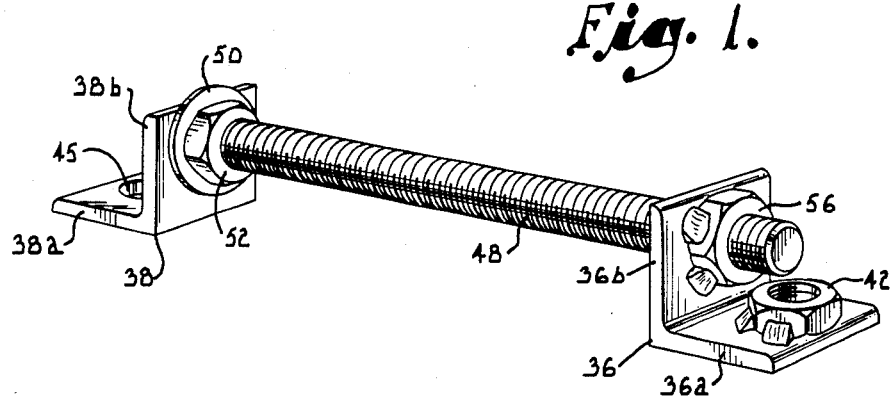
FIG. 1 is a perspective view of a belt tensioning device constructed according to a preferred embodiment of the present invention.
Figure 2:
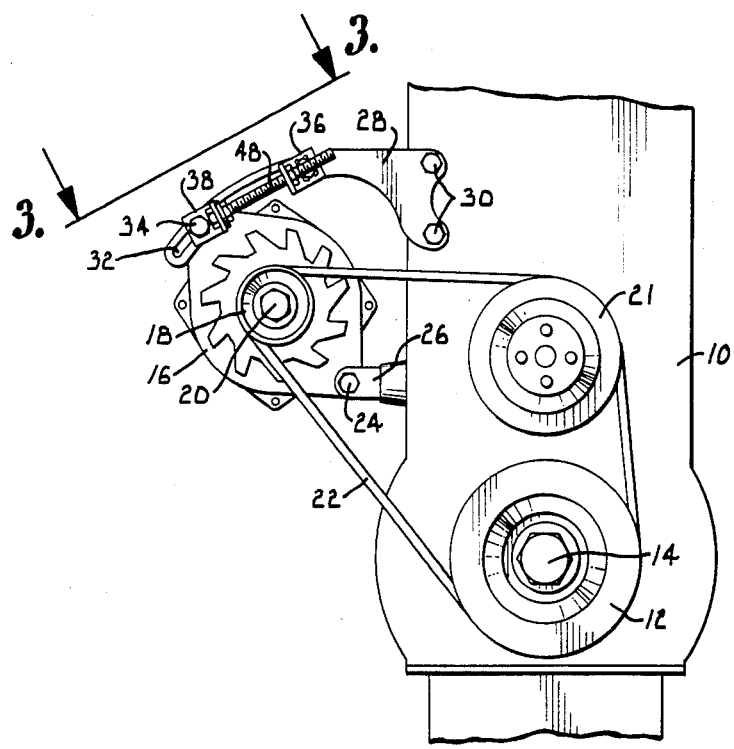
FIG. 2 is a front elevational view showing the device mounted on an engine.

Referring now to the drawings in more detail and initially to FIG. 2, numeral 10 designates an engine block which may be the block of an automobile engine. The engine drives a pulley 12 which is secured by bolt 14 to the engine shaft. An accessory such as an alternator 16 is driven by a pulley 18 secured on the alternator shaft by a bolt 20. A V-belt 22 is drawn around pulleys 12 and 18 (and around another pulley 21) in order to transmit power from the drive pulley 12 to the driven pulley 18.

The alternator 16 can be angularly adjusted in order to vary the tension of the drive belt 22. A bolt 24 pivotally connects the bottom portion of the alternator with a mounting arm 26 which projects from the engine block. By adjusting the angular position of alternator 16 about the pivot axis defined by bolt 24, the distance between pulleys 12 and 18 can be varied to adjust the tension of belt 22.

The top portion of the alternator 16 is connected with a slotted plate 28. A pair of bolts 30 connect plate 28 with the engine block 10. Plate 28 is provided with an arcuate slot 32 which is formed about the pivot axis defined by bolt 24. An adjustment bolt 34 is extended through slot 32 and is threaded into the alternator 16. When bolt 34 is fully tightened, it rigidly secures alternator 16 to plate 28 and prevents the alternator from moving about bolt 24. On the other hand, when bolt 34 is loosened, the alternator can move angularly about bolt 24 with the adjustment bolt 34 moving in the arcuate slot 32.

Figure 3:
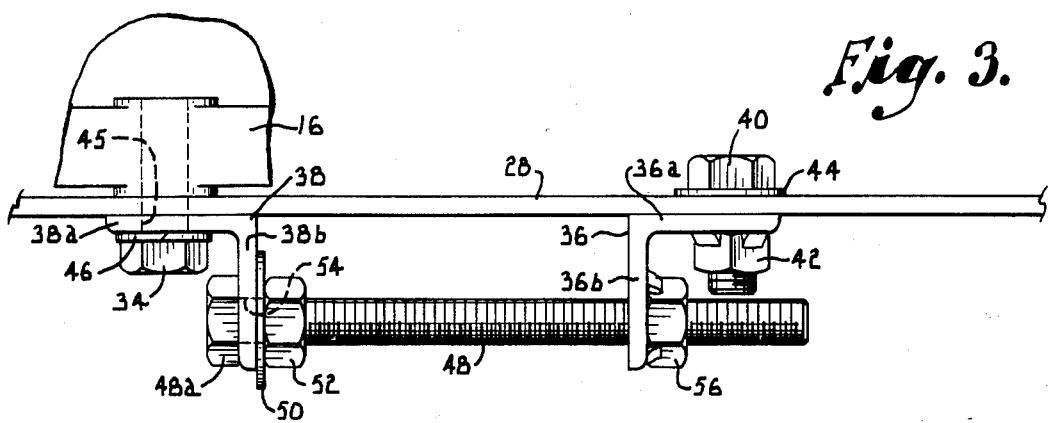
FIG. 3 is a fragmentary enlarged view taken generally along line 3—3 of FIG. 2 in the direction of the arrows.

In accordance with the present invention, a belt tensioning device includes a pair of angle brackets 36 and 38. The brackets 36 and 38 each include mutually perpendicular flanges 36a and 36b and 38a and 38b, respectively. Bracket 36 is secured directly to plate 28 by a small bolt 40. As best shown in FIG. 3, bolt 40 is extended through slot 32 (or through a separate opening in plate 28) and is threaded through a nut 42 which is welded or otherwise secured to flange 36a. A washer 44 is interposed between the head of bolt 40 and the slotted plate 28. Bracket 36 is thus secured to plate 28 with flange 36a located flatly against the plate and flange 36b projecting away from the plate. Bracket 36 is preferably allowed to turn in limited fashion about bolt 40.

The other angle bracket 38 is connected with the alternator 16 by the adjustment bolt 34. Bolt 34 extends through an opening 45 formed in flange 38a and is then extended through slot 32 and threaded into the alternator 16. A washer 46 is interposed between flange 36a and the head of bolt 34. Bolt 34 locates flange 38a flatly against plate 28 with the other flange 38b projecting away from the plate at a location spaced from and parallel to the corresponding flange 36b of the other angle bracket 36.

A machine screw 48 extends between flanges 36b and 38b. Screw 48 has a hex head 48a on one end which bears against one side of flange 38b. A washer 50 contacts the opposite side of flange 38b and is held in place by a nut 52 which is threaded onto the shank of bolt 48 and welded or otherwise rigidly secured thereto. Bolt 48 extends loosely through an opening 54 (FIG. 3) formed in flange 38b and is able to turn in the opening. The screw head 48a and nut 52 prevent screw 48 from moving axially with respect to bracket 38 when the screw is turned.

The opposite end of screw 48 extends through flange 36b and is threaded through a nut 56 which is welded or otherwise secured to flange 36b. It is to be understood that nuts 42 and 56 can be replaced by internally threaded openings formed in flanges 36a and 36b, respectively.

To install the belt tensioning device, bolt 34 is extended through flange 38a, through the arcuate slot 32 and is threaded into the alternator 16. This connects bracket 38 with the alternator and maintains flange 38a flatly against the slotted plate 28. The other bracket 36 is connected with plate 28 by tightening bolt 40 to the extent desired.

Adjustment of the tension of belt 22 is carried out by loosening bolt 34 somewhat and then turning the machine screw 48 in the proper direction, depending upon whether the belt is to tightened or loosened. If the belt is to be tightened, a suitable wrench is applied to the head 48a of the screw, and the screw is turned in a direction to effect retraction of the screw with respect to nut 56. Screw 48 acts as a screw drive to move bracket 38 away from bracket 36 (once bolt 40 reaches the end of slot 32), thereby angularly adjusting alternator 16 about bolt 24 in a direction to tighten the belt or increase its tension. The alternator 16 moves in unison with bracket 38 due to the connection provided by bolt 34.

As bracket 38 moves away from bracket 36, the shank of the adjustment bolt 34 moves along and within the arcuate slot 32. Also, bracket 38 is able to pivot about the adjustment bolt 34 and the other bracket 36 is permitted to pivot as required about its mounting bolt 40. In this manner, flanges 36b and 38b are maintained parallel to one another at all times to avoid applying bending stresses to the machine screw 48.

When the belt has been adjusted to the proper tension, bolts 34 and 40 can be tightened in order to secure the alternator 16 in place and relieve the force on screw 48. It should be apparent that loosening of belt 22 can be accomplished by loosening bolt 34 and turning screw 48 in the opposite direction in order to move bracket 38 closer to bracket 36 before the adjustment bolt 34 is tightened again.

It is important to note that the belt tensioning device achieves the precise tension of the belt that is desired without the need for utilizing a pry bar or any other special tools. All that is needed is a conventional wrench which is necessary in any event to loosen the adjustment bolt 34. Preferably, the two bolt heads and the screw head are hex heads of the same size so that the same wrench can be applied to all three. It is equally important to recognize that the belt tensioning device can be quickly and easily installed in the field by unskilled personnel. The only tool required is a wrench which fits the heads of bolts 34 and 40.

If necessary due to space limitations, bracket 36 can be reversed so that the free end of flange 36a points toward bracket 38. This has the effect of permitting the bolt holes in flanges 36a and 38a to be located closer together, such as when bolt 34 is near the right end of slot. As previously indicated, bolt 40 can be extended through a separate opening in plate 28 rather than through slot 32 if desired. As still another alternative in limited space situations, bolt 40 can be extended through slot 32 at a location to the left of bolt 34 (as viewed in FIG. 3) and can be secured against movement to the right in the slot by an anchor bolt (not shown) extended through the slot and secured by a nut. In this situation, the belt is tightened by turning screw 48 in a direction to pull bracket 38 toward bracket 36 or to the left as viewed in FIG. 3.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated and is within the scope of the claims.

Since many possible embodiments may be made of the invention without separating from the scope thereof, it is to be understood that all matter herein set forth or shown in the accompanying drawing is to be interpreted as illustrative and not in a limiting sense.

Having thus described the invention, I claim:

1. A field installed tensioning device for an engine driven drive belt engaging an accessory pulley which serves to drive an accessory mounted on the engine for angular adjustment about a pivot axis to adjust the belt tension, said device comprising:
   a slotted plate mounted on the engine and having an arcuate slot formed about said pivot axis;
   first and second brackets;
   a first bolt connecting said first bracket to said slotted plate;
   a second bolt extending through said second bracket and said slot and engaging said accessory, said second bolt having a loose condition permitting angular adjustment of the second bracket and accessory about said pivot axis to vary the belt tension as said second bolt moves in said slot, and a tight condition wherein the second bolt secures the second bracket and accessory against movement relative to the slotted plate; and
   a screw extending between said brackets, said screw having a head end connected to one bracket in a manner to be capable of turning relative thereto and being in threaded engagement with the other bracket, whereby turning of the screw while said second bolt is in the loose condition effects movement of said brackets toward and away from one another to vary the belt tension.

2. A device as set forth in claim 1, wherein said second bracket has a flange which said bolt secures against said slotted plate in the tight condition of the bolt.

3. A device as set forth in claim 2, wherein said slotted plate is disposed between said flange of the second bracket and said accessory.

4. A device as set forth in claim 1, wherein:
   said first bracket comprises an angle member having first and second flanges; and
   said first bolt extends through said slotted plate and is threaded to said first flange to secure the same flatly against the slotted plate with said second flange projecting away from said plate.

5. A device as set forth in claim 4, including means providing threads on said second flange, said screw being in threaded contact with said threads.

6. A device as set forth in claim 5, wherein:
   said second bracket comprises an angle member having first and second flanges; and
   said second bolt extends through said first flange of the second bracket to locate same flatly against said slotted plate with said second flange of the second bracket projecting away from said plate generally parallel to and spaced from said second flange of the first bracket.

7. A device as set forth in claim 6, wherein:
   said screw extends loosely at the head end thereof through said second flange of the second bracket in a manner to be capable of turning relative to the second flange; and
   said second flange of the first bracket presents a threaded hole in which said screw is threaded.

8. A device as set forth in claim 7, including means for preventing said screw from moving axially with respect to said second flange of the second bracket.

9. In a belt drive arrangement having a drive pulley turned by an engine, a driven pulley on an accessory to drive the same, a flexible belt drawn around said drive and driven pulleys to transmit power therebetween, and means mounting the accessory for angular movement about a pivot axis to adjust the belt tension, a belt tensioning device comprising:
   a slotted plate mounted on the engine and having an arcuate slot formed about said pivot axis;
   first and second brackets;
   a bolt extending through said first bracket and said slot into threaded engagement with the accessory, said bolt having a loose condition permitting movement of the first bracket and accessory in unison with the bolt moving in said arcuate slot, and a tight condition releasably securing said first bracket and accessory to said slotted plate, said bolt being removable from said accessory to permit removal of the first bracket from the plate;
   releasable means for mounting said second bracket on said slotted plate; and
   a threaded screw having a head end connected with one bracket in a manner to be capable of turning relative thereto without axial movement of the screw relative to said one bracket, said screw being in threaded engagement with the other bracket to effect movement of the brackets toward and away from one another in response to turning of the screw while said bolt is in the loose condition, whereby to adjust the belt tension.

10. A device as set forth in claim 9, wherein said releasable means comprises a bolt for securing said second bracket against said slotted plate.

11. A device as set forth in claim 9, including:
    an opening in said one bracket through which said screw extends loosely to permit the screw to turn in the opening;
    a screw head on said head end of the screw disposed adjacent one side of said one bracket; and
    a nut member secured on said screw and disposed adjacent the opposite side of said one bracket to cooperate with said screw head in preventing axial movement of said screw relative to said one bracket.

12. A belt tensioning device for installation in the field on an engine having an engine powered drive pulley, a driven pulley powering an accessory, a belt engaging said drive and driven pulleys, and means for mounting the accessory in a manner permitting angular adjustment thereof about a pivot axis to adjust the belt tension, said device comprising:
    a slotted plate mounted on the engine and having an arcuate slot formed therein about the pivot axis;
    a first angle bracket having first and second flanges;
    releasable means for mounting said first bracket on said slotted plate with the first flange secured flatly to the plate and the second flange projecting away from the plate;
    a second angle bracket having first and second flanges;
    a bolt extending through said first flange of the second bracket and through said slot into threaded engagement with the accessory to connect said second bracket and said accessory for movement in unison, said bolt having a tight condition releasably securing said second bracket and accessory to the slotted plate with said first flange of the second bracket flatly contacting the plate and said second flange thereof projecting away from the plate at a location spaced from and generally parallel to the second flange of said first bracket, said bolt having a loose condition wherein said second bracket and accessory can move in unison about said pivot axis with said bolt travelling along said arcuate slot; and a threaded screw disposed in threaded engagement with the second flange of one bracket and connected with the second flange of the other bracket for rotation relative thereto but restricted against axial movement relative thereto, whereby turning of said screw in opposite directions with said bolt in the loose condition moves said brackets toward and away from one another to adjust the belt tension.

13. A device as set forth in claim 12, wherein said releasable means comprises a second bolt for securing said first flange of the first angle bracket flatly against said slotted plate.

14. A device as set forth in claim 13, wherein said first flange of the first bracket has a threaded opening for threaded engagement with said second bolt.

15. A device as set forth in claim 12, including:

an opening in said second flange of the second bracket through which said screw extends loosely to permit the screw to turn in the opening;

a head on said screw adjacent one side of said second flange of the second bracket; and a nut member secured on said screw adjacent the opposite side of said second flange of the second bracket to cooperate with said head to prevent axial movement of the screw relative to the second bracket.

* * * * *